C. E. FORKNER.
HARROW.
APPLICATION FILED OCT. 15, 1910.
995,779.
Patented June 20, 1911.
2 SHEETS—SHEET 1.
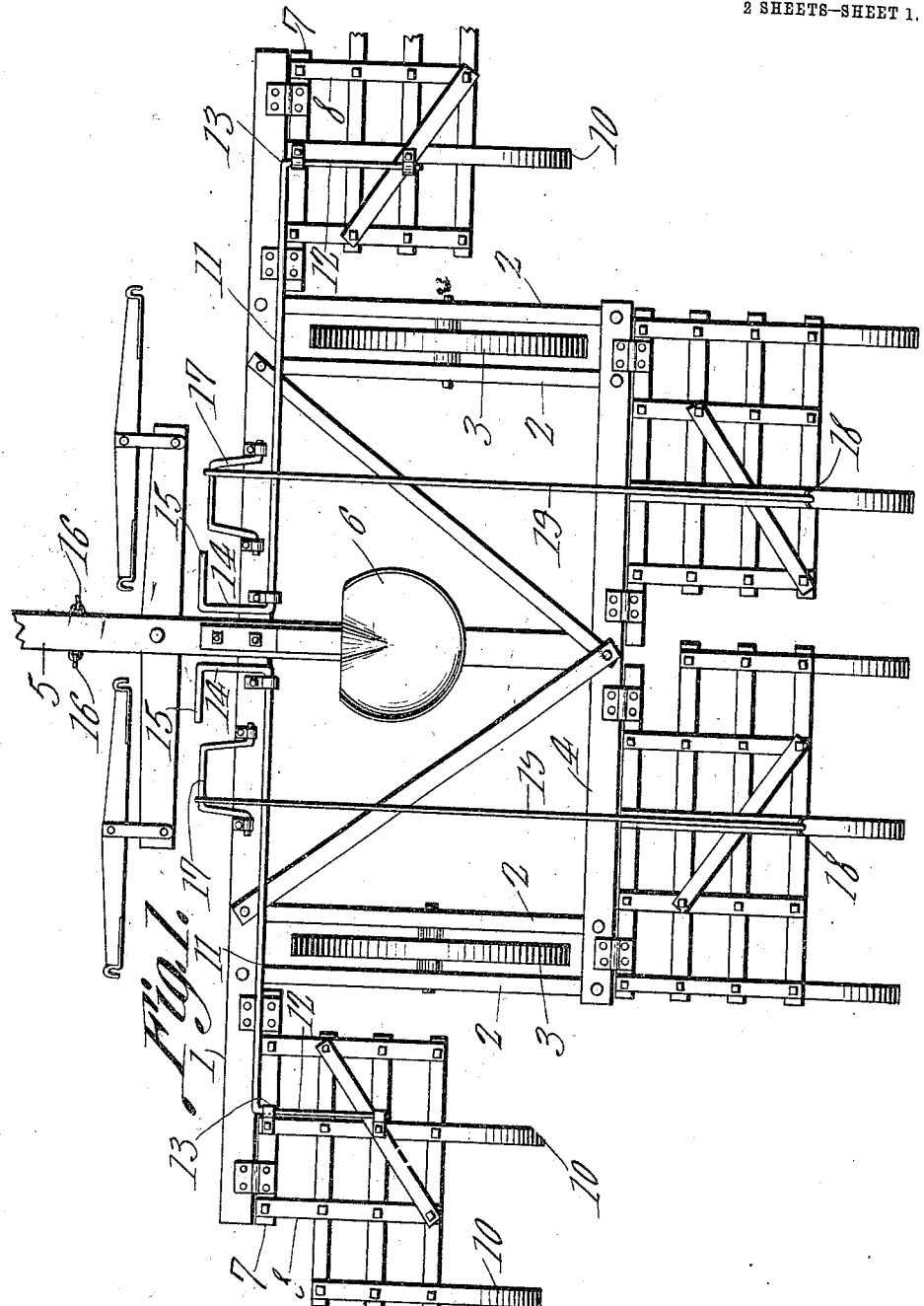

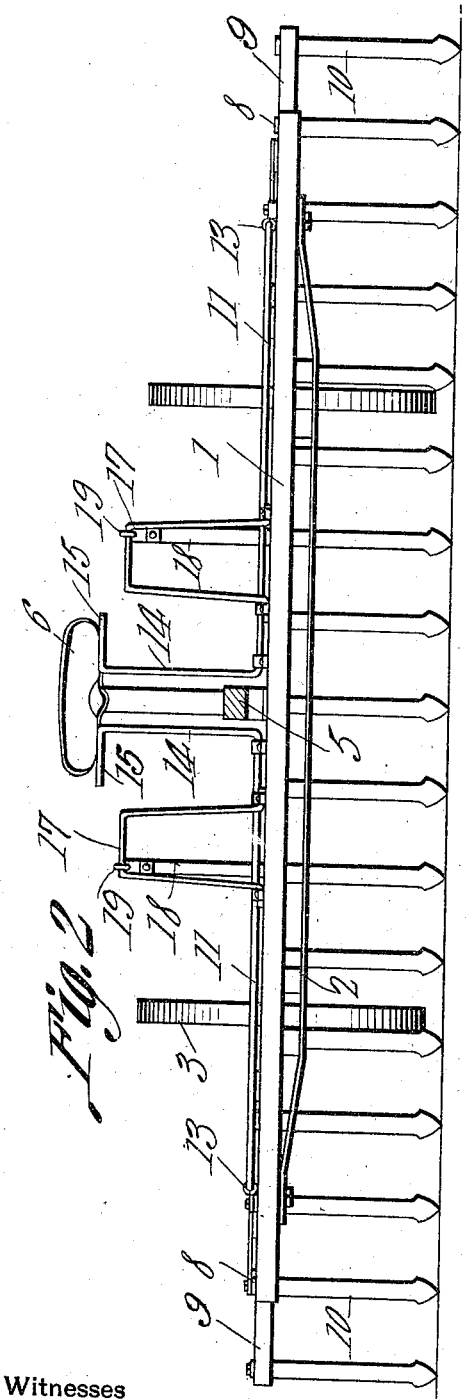
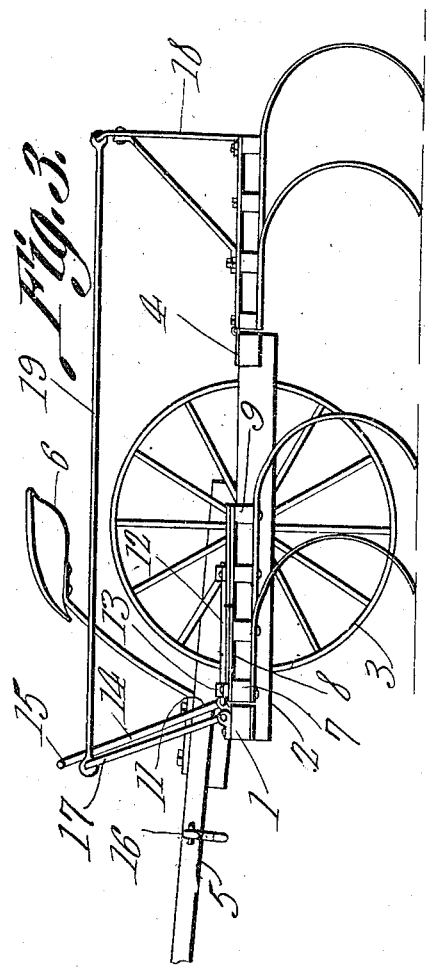

ered in the structure in-
UNITED STATES PATENT OFFICE.

CHARLES E. FORKNER, OF ATHENS, TEXAS.

HARROW.

995,779.

Specification of Letters Patent. Patented June 20, 1911.

Application filed October 15, 1910. Serial No. 587,272.

*To all whom it may concern:*

Be it known that I, CHARLES E. FORKNER, a citizen of the United States, residing at Athens, in the county of Henderson and State of Texas, have invented a new and useful Harrow, of which the following is a specification.

This invention has relation to harrows and it consists in the novel construction and arrangement of its parts as hereinafter shown, described and claimed.

The object of the invention is to provide an implement especially adapted to be used for orchard purposes wherein members may be readily swung in vertical directions to be relieved of accumulation of trash and for the purpose of escaping trees or other objects.

With this object in view the structure includes a frame to which is attached a draft beam and upon which is mounted an operator's seat. Harrow sections (preferably four in number) are hingedly connected with the frame and each harrow section is connected with a pedal means which is in convenient reach of one occupying the seat upon the frame, whereby each harrow section may be readily swung in a vertical direction to free itself of accumulations or escape objects as above stated.

In the accompanying drawings,—Figure 1 is a top plan view of the harrow. Fig. 2 is a front end elevation of the same. Fig. 3 is a side elevation of the same.

The harrow includes a frame which consists of a beam 1 to which are secured the forward ends of rearwardly disposed bars 2. The bars 2 are arranged in pairs and between the members of each pair is journaled a supporting wheel 3. A beam 4 connects the rear ends of the bars 2 together and is considerably less in length than the beam 1, whereby the end portions of the beam 1 project beyond the end of the beam 4. A draft tongue 5 is attached at a point between its ends to the beam 1. Said tongue is parallel with the bars 2. An operator's seat 6 is preferably mounted upon the tongue 5 but may be supported upon any other member constituting the frame as hereinbefore described.

Bars 7 are hingedly attached to the edge portions of the beam 1 or those portions of said beam which project beyond the outermost bars 2 and the forward ends of the bars 8 are attached to the intermediate portions of the bars 7. Bars 9 are attached to the bars 8 and extend transversely with relation to the same. Spring harrow teeth 10 are attached to the bars 9.

As above stated one of the harrow sections as described is hingedly attached to each of the projecting ends of the beam 1 and also it will be seen by reference to Fig. 1 that similar harrow sections are hingedly attached to the beam 4. Shafts 11 are journaled upon the beam 1 and are provided with crank ends 12 which are slidably received in eyes 13 carried by those harrow sections which are hingedly connected with the projecting ends of the beam 1. At their inner ends the shafts 11 are continued into levers 14 having foot pedals 15 within reach of one occupying the seat 6. Hooks 16 are attached to the sides of the tongue 5 and when the lever ends 14 of the shaft 11 are swung down they may be engaged by the said hooks whereby the said levers are held against rotation and the harrow sections at the ends of the beam 1 are held in swung up position.

U-shaped levers 17 are fulcrumed upon the intermediate portions of the beam 1 and are within reach of one occupying the seat 6. Standards 18 are mounted upon the harrow sections which are hingedly connected with the beam 4 and rods 19 connect the levers 17 with the said standards 18. Therefore it will be seen that by swinging the levers 17 or by turning the shaft 11 any or all of the harrow sections may be swung in an upward direction and thus may be individually or collectively freed of accumulations or positioned so as to ride over obstructions.

What is claimed is:—

1. A harrow comprising a frame consisting of a relatively long forward beam and a relatively short rear beam with side bars connecting the said beams together, wheels supporting the said frame, harrow sections hingedly attached to the projecting edge portions of the relatively long forward beam, and harrow sections hingedly attached to the relatively short rear beam.

2. A harrow comprising a frame consisting of a relatively long forward beam, a relatively short rear beam, side bars connecting the said beams together and arranged in pairs, supporting wheels journaled to the frame between the members of the pairs of side bars, harrow members hingedly attached to the projecting end portions of the relatively long forward beam, and harrow sections hingedly attached to the rear beam.

3. A harrow comprising a frame consisting of a relatively long forward beam, a relatively short rear beam, and side bars connecting said beams together, wheels supporting the said frame, an operator's seat mounted upon the said frame, harrow sections hingedly attached to the projecting end portions of the relatively long forward beam, lever mechanisms mounted upon the frame and connected with said sections, harrow sections hingedly attached to the rear beam, and lever mechanisms mounted upon the frame and connected with the last mentioned sections.

In testimony that I claim the foregoing as my own, I have hereto affixed my signature in the presence of two witnesses.

CHARLES E. FORKNER.

Witnesses:
R. C. Faulk,
W. A. Ownby.